US012638040B2

(12) United States Patent (10) Patent No.: US 12,638,040 B2
Ramsteiner (45) Date of Patent: May 26, 2026

(54) FASTENER ARRANGEMENT

(71) Applicant: Click & Glue GmbH, Bissingen (DE)

(72) Inventor: Willi Ramsteiner, Bergdietikon (CH)

( * ) Notice: Subject to any disclaimer, the term of this patent is extended or adjusted under 35 U.S.C. 154(b) by 48 days.

(21) Appl. No.: 18/537,858

(22) Filed: Dec. 13, 2023

(65) Prior Publication Data

US 2025/0146522 A1 May 8, 2025

(30) Foreign Application Priority Data

Nov. 7, 2023 (DE) .......................... 102023130725.8

(51) Int. Cl.
*F16B 47/00* (2006.01)
*F16B 9/00* (2006.01)
*F16B 17/00* (2006.01)
*F16B 25/00* (2006.01)

(52) U.S. Cl.
CPC ............ *F16B 47/003* (2013.01); *F16B 9/056* (2018.08); *F16B 17/006* (2013.01); *F16B 25/0031* (2013.01); *F16B 2200/10* (2018.08); *F16B 2200/40* (2018.08)

(58) Field of Classification Search
CPC ...... F16B 47/003; F16B 9/056; F16B 17/006; F16B 25/0031; F16B 2200/10; F16B 11/006
See application file for complete search history.

(56) References Cited

U.S. PATENT DOCUMENTS

| | | | | |
|---|---|---|---|---|
| 4,555,206 A | * | 11/1985 | Sweeney | F16B 13/143 411/258 |
| 4,830,558 A | * | 5/1989 | Sweeney | F16B 13/143 248/205.3 |
| 5,641,140 A | * | 6/1997 | Sorenson | A47B 13/16 403/267 |
| 7,819,452 B2 | * | 10/2010 | Fuchs | F16B 11/006 156/60 |
| 9,283,737 B2 | * | 3/2016 | Ndagijimana | B32B 37/12 |
| 9,618,032 B2 | * | 4/2017 | Woo | F16B 47/003 |
| 10,378,569 B2 | * | 8/2019 | Jensen | F16B 11/006 |

(Continued)

FOREIGN PATENT DOCUMENTS

| | | |
|---|---|---|
| DE | 202018106227 U1 | 3/2020 |
| WO | 2014166773 A1 | 10/2014 |

*Primary Examiner* — Jason W San
*Assistant Examiner* — Matthew J Sullivan
(74) *Attorney, Agent, or Firm* — JCIP; Joseph G. Chu

(57) ABSTRACT

A fastener arrangement with a fastener designed for fastening to a substrate via an adhesive agent, and with an object having an object mount, whereby the object mount can be fixed to the fastener fastened to the substrate. The fastener has a reinforcement part made of a metallic material having a flat body with openings and side wall elements adjoining it. The side wall elements are mounted between a retaining ring and wall segments of a ring-shaped holder and are designed for fixing the object mount. There is an adhesive reservoir, the bottom of which facing the substrate is only delimited by the flat body. The top of the adhesive reservoir is delimited by a press-on element; via a displacement of the press-on element in the axial direction, adhesive agent is guided out of the adhesive reservoir solely through the openings in the flat body of the reinforcement part.

18 Claims, 13 Drawing Sheets

(56)  References Cited

U.S. PATENT DOCUMENTS

| | | | |
|---|---|---|---|
| 11,719,275 B2 * | 8/2023 | Chen | F16B 47/006 |
| | | | 248/205.4 |
| 11,913,599 B1 * | 2/2024 | Schoenfeld | F16M 13/02 |
| 11,971,058 B2 * | 4/2024 | Ramsteiner | F16M 13/02 |
| 12,312,021 B2 * | 5/2025 | Hollmann | B62D 35/007 |
| 2023/0130216 A1 * | 4/2023 | Berryman | F16B 5/0642 |
| | | | 89/36.09 |
| 2023/0172381 A1 * | 6/2023 | Pegden | A47H 1/142 |
| | | | 4/610 |

* cited by examiner

8

FASTENER ARRANGEMENT

CROSS REFERENCE TO RELATED APPLICATIONS

This application claims the priority of DE 102023130725.8 filed on 2023 Nov. 7; this application is incorporated by reference herein in its entirety.

BACKGROUND

The invention relates to a fastener arrangement.

Such a fastener arrangement having a fastener is known from WO 2014/166773 A1.

This fastener arrangement serves to form an adhesive connection between an object and a support. The object has a reservoir with an adhesive agent that, with a wall having a predetermined breaking point, abuts a contact surface. The object has a button with a push-through means assigned to it, said means having the shape of a thorn or point, wherein when the button is actuated, the push-through means creates a hole in the wall of the reservoir, through which hole adhesive agent is guided from the reservoir onto the contact surface and forms an adhesive layer for fastening the object to the support.

In this device, the adhesive agent required for fastening to the support is stored in the object itself. The adhesive agent is released in a simple way through button-pushing, i.e. by actuating a button provided on or in the object itself. When this button is pushed, the adhesive agent flows from the reservoir onto the contact surface and there forms an adhesive layer, by means of which the object can be fastened to the support.

It is advantageous that the adhesive connection can be produced rapidly.

It is disadvantageous that the integration of the push-through means in the shape of a thorn or point requires undesirably high design effort, especially since the push-through means must be positioned exactly to the wall to ensure that a reproducible hole is made in this wall. This requires exact, low-tolerance mounting and as a result, requires high production costs for manufacturing the device.

DE 20 2018 106 227 U1 relates to a fastener with a support, which has a fastening side for fastening to an object. The support has a through borehole in the axial direction. An adhesive reservoir and a reservoir unit for a hydrophilic substance are mounted in the axial direction of the borehole so to be displaceable against one another. The adhesive reservoir and the receptacle body form a coaxial arrangement wherein the adhesive reservoir encloses the reservoir unit. In a starting position of the reservoir unit relative to the support, an aerobic adhesive agent is stored in a closed receptacle of the adhesive reservoir. The hydrophilic substance is stored in a closed receptacle in the reservoir unit. By displacing the reservoir unit into an actuation position, the receptacles are broken open by means of push-through means and the aerobic adhesive agent is supplied through a channel structure between the adhesive reservoir and the reservoir unit, and the hydrophilic substance is supplied through outlet openings in the reservoir unit to the fastening side, such that an autonomous mixing of the aerobic adhesive agent and the hydrophilic substance takes place.

With regard to this fastener, it is disadvantageous that the adhesive reservoir, on the one hand, and the reservoir unit for the hydrophilic substance, on the other hand, necessitate a relatively high design effort, especially since they must be displaceable against one another. Moreover, a not insubstantial design effort is required for thoroughly mixing the adhesive agent with the hydrophilic substance.

SUMMARY

The invention relates to a fastener arrangement (1) with a fastener (2) designed for fastening to a substrate by means of an adhesive agent, and with an object (4) having an object mount (3), whereby the object mount (3) can be fixed to the fastener (2) fastened to the substrate. The fastener (2) has a reinforcement part (11) made of a metallic material, wherein the reinforcement part (11) has a flat body (11a) with openings (18) and side wall elements (19) adjoining it. The side wall elements (19) are mounted between a retaining ring (10) and wall segments (9b) of a ring-shaped holder (9), wherein the side wall elements (19) of the reinforcement part (11) are designed for fixing the object mount (3). There is an adhesive reservoir (20), the bottom of which facing the substrate is only delimited by the flat body (11a) of the reinforcement part (11). The top of the adhesive reservoir (20) is delimited by a press-on element (8), wherein by a displacement of the press-on element (8) in the axial direction, adhesive agent is guided out of the adhesive reservoir (20) only through the openings (18) in the flat body (11a) of the reinforcement part (11), such that the adhesive agent fixes the fastener (2) to the substrate.

DETAILED DESCRIPTION

The invention seeks to solve the problem of providing a fastener arrangement of the type mentioned at the outset that has a simple design and simultaneously, high functionality and functional reliability.

The features of claim 1 are provided to solve this problem. Advantageous embodiments and useful further developments of the invention are described in the dependent claims.

The invention relates to a fastener arrangement with a fastener designed for fastening to a substrate by means of an adhesive agent, and with an object having an object mount, wherein the object mount can be fixed to the fastener fastened on the substrate. The fastener has a reinforcement part composed of a metallic material, wherein the reinforcement part has a flat body with openings and side wall elements adjoining it. The side wall elements are mounted between a retaining ring and wall segments of a ring-shaped holder, wherein the side wall elements of the reinforcement part are designed for fixing the object mount. There is an adhesive reservoir, the bottom of which facing toward the substrate is only delimited by the flat body of the reinforcement part. Its top is delimited by a press-on element, wherein by a displacement of the press-on element in the axial direction, adhesive agent is guided out of the adhesive reservoir only via the openings in the flat body of the reinforcement part, such that the adhesive agent fixes the fastener to the substrate.

The fastener arrangement according to the invention generally serves for fastening an object to a substrate by means of a fastener, wherein the substrate especially can be formed by a wall of a building.

The objects to be fastened can be accessories for bathrooms, for example.

An essential requirement of such fastener arrangements is that objects can be fastened to the substrate with the fastener stably for a long time, wherein an essential requirement of the fastener is that it can withstand large forces, and not only pressure forces, but also shear forces, without the fastener detaching from the substrate.

This requirement is satisfied by the fastener arrangement according to the invention. An essential aspect of the invention is that the fastener has a reinforcement part composed of a metallic material, especially of steel.

On the one hand, this reinforcement part serves to stabilize the fastener itself, and on the other hand, ensures a stable coupling to the object mount.

The additional components of the fastener, especially the ring-shaped holder, the retaining ring and the press-on element, can be composed of plastic.

Advantageously, the fastener has an essentially rotationally-symmetrical outer contour.

Accordingly, the retaining ring and the ring-shaped holder are circular ring-shaped. Furthermore, the flat body of the reinforcement part is circular-disk shaped.

The fastener according to the invention has high functionality and a simple design structure.

In this context, it is essential that both the retaining ring as well as the ring-shaped holder be designed in the form of rings, such that only the reinforcement part and the press-on element are flat elements which extend over the entire, or almost the entire, cross-sectional area.

The ring-shaped holder and the retaining ring constitute elements for fixing the reinforcement part, the retaining ring serves for fixing and guiding the press-on element, wherein for this purpose the ring-shaped holder and the retaining ring are only in engagement with the edge regions of the reinforcement part and of the press-on element.

Solely the press-on element and the reinforcement part are provided for delimiting the adhesive reservoir on its top and bottom. It is advantageous for the lateral delimitation of the adhesive reservoir to be realized by the retaining ring.

A secure mounting of the reinforcement part is achieved advantageously in that the retaining ring is mounted to the ring-shaped holder so as to be secured against rotation.

The retaining ring is mounted on the ring-shaped holder so as to be secured against rotation particularly in that protrusions open out on the inner side of the ring-shaped holder, which protrusions engage in the cavities on the outer lateral surface of the retaining ring.

Further advantageously, the reinforcement part has two identical side wall elements that open out on wall segments of the flat body that are situated opposite one another.

In particular, the side wall elements form a mirror-symmetrical arrangement.

In this context, starting from the wall segments of the flat body, the side wall elements run outwards at an inclination to the flat body.

The side wall elements are mounted with minimal play in gaps of a side wall of the ring-shaped holder such that the outer edges of the side wall elements project beyond the outer lateral surface of the ring-shaped holder.

The outer edges of the side wall elements serve for fixing the object mount.

The reinforcement part therefore fulfills a multiple function, namely delimiting the adhesive reservoir and also constituting a fixing means for the object mount. Moreover, the metallic reinforcement part serves to stabilize the entire fastener.

Advantageously, the object mount has the shape of a hollow cylinder, which is open at one end. The fastener can be inserted into the object mount through the open end, wherein the outer edges of the side wall elements abut the inner side of the hollow cylinder.

For fixing the object mount to the fastener, it is useful to guide a setscrew mounted in the object mount against one of the side wall elements of the reinforcement part.

Compared to screw connections, this fixing by means of the setscrew guided against the inclined side wall element is a simple design solution that still provides a secure, including vis-a-vis tolerances of the individual components, secure fastening options.

The press-on element can be displaced by exerting a pressure force in an axial direction, such that the press-on element is guided against the flat body of the reinforcement part. Adhesive agent is thus guided out of the adhesive reservoir through the openings of the flat body of the reinforcement part, wherein the adhesive agent guided out through the openings of the flat body of the reinforcement part forms an adhesive layer, the top of which is delimited by the flat body of the reinforcement part and the bottom of which is in contact with the substrate.

This is achieved, in particular, in that the press-on element is moved in the axial direction until it abuts the flat body of the reinforcement part. All of the adhesive agent is thus guided out of the adhesive reservoir, through the openings of the flat body of the reinforcement part.

Especially advantageously, the press-on element can be shifted from a locked position to an actuation position, wherein in the locked position adhesive agent can be stored in the adhesive reservoir. In the actuation position, adhesive agent is guided out of the adhesive reservoir through the openings of the flat body of the reinforcement part.

The press-on element is shifted manually by a user from the locked position to the actuation position, wherein advantageously, the user turns the press-on element from the locked position to the actuation position while simultaneously exerting pressure on the press-on element, by which it is moved also in the axial direction.

According to an embodiment that has been optimized accordingly from a design perspective, the press-on element has a circular-disk shaped base and a circumferential wall on its edge, wherein on the upper edge of the wall, latching lips that project outward beyond the edge of the wall are provided.

Advantageously, two identically designed latching lips are provided, arranged offset by 180°.

Adapted thereto, recesses in the retaining ring corresponding to the latching lips are provided, the contours and number of which recesses are adapted to the contours and number of the latching lips, whereby the recesses in each case open out on the top and inner side of the retaining ring.

In this case, the in the locked position the press-on element with the latching lips lies on the edge of the retaining ring, such that the press-on element projects upward beyond the top of the retaining ring and the bottom of the base is distanced from the flat body of the reinforcement part. The intermediate space between the base of the retaining ring and the flat body of the reinforcement part forms the adhesive reservoir.

In the locked position, adhesive agent can be stored in the adhesive reservoir.

To fasten the fastener to the substrate, the reinforcement part is switched out of the locked position into the actuation position by rotating the reinforcement part and pressing against the top of the reinforcement part, in which actuation position the latching lips of the reinforcement part lie inside the recesses of the retaining ring, and the base of the press-on element is guided against the flat body of the reinforcement part.

By this, the plastic is guided out of the adhesive reservoir through the openings of the flat body and then forms the adhesive layer, which cures by air contact, by which the fastener is permanently fastened to the substrate.

Advantageously, an adhesive strip is provided on the bottom of the ring-shaped holder, wherein a pre-fixing of the fastener to the substrate can be carried out by means of the adhesive strip.

According to an advantageous embodiment, the press-on element has a filling opening through which adhesive agent can be supplied into the adhesive reservoir when the press-on element is in the locked position.

It is useful for adhesive agent stored in a tube to be supplied to the adhesive reservoir through the filling opening.

The filling opening has a thread onto which a threaded head of the tube can be screwed. Adhesive agent can be supplied to the adhesive reservoir when the tube is screwed onto the filling opening.

According to an alternative embodiment, there is no need to provide a filling opening in the press-on element. When the press-on element is in the locked position, the fastener can form a pre-mounted ready-to-use unit, the adhesive reservoir of which had been filled with adhesive agent in advance, i.e., during the production process. This unit is then stored in an airtight vacuum-sealed package, so that the adhesive agent does not cure inside the adhesive reservoir.

When the fastener is being used, it is taken out of the package and pre-fixed to the substrate by means of the adhesive strip. The press-on element is then switched from the locked position to the actuation position, whereby the adhesive agent is guided out of the openings in the flat body and forms the adhesive layer. The adhesive agent cures by air contact and serves to fix the fastener to the substrate.

BRIEF DESCRIPTION OF THE DRAWINGS

The invention is explained in the following based on the drawings. They show.

DETAILED DESCRIPTION OF THE PREFERRED EMBODIMENTS

Figure 1:
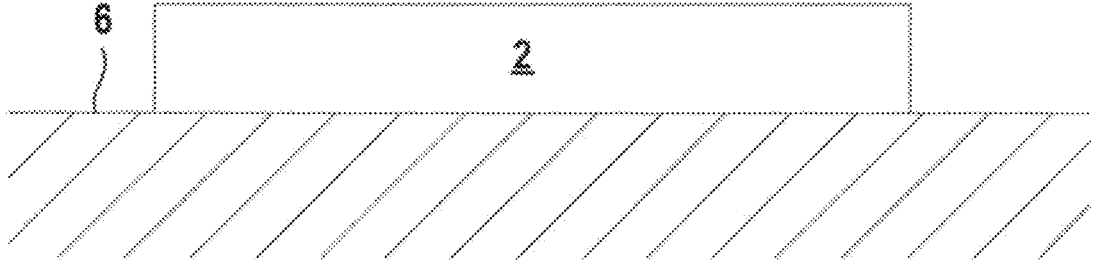
FIG. 1: Schematic depiction of an exemplary embodiment of the fastener arrangement according to the invention, with a fastener.

FIG. 1 shows an exemplary embodiment of the fastener arrangement 1 according to the invention. The fastener arrangement 1 is composed of a fastener 2 as well as an object 4 with an object mount 3. In the present case, the object 4 is a hand towel holder. The object 4 can also be formed by another accessory. The body 5 of the object 4 connects to the object mount 3.

Figure 4:
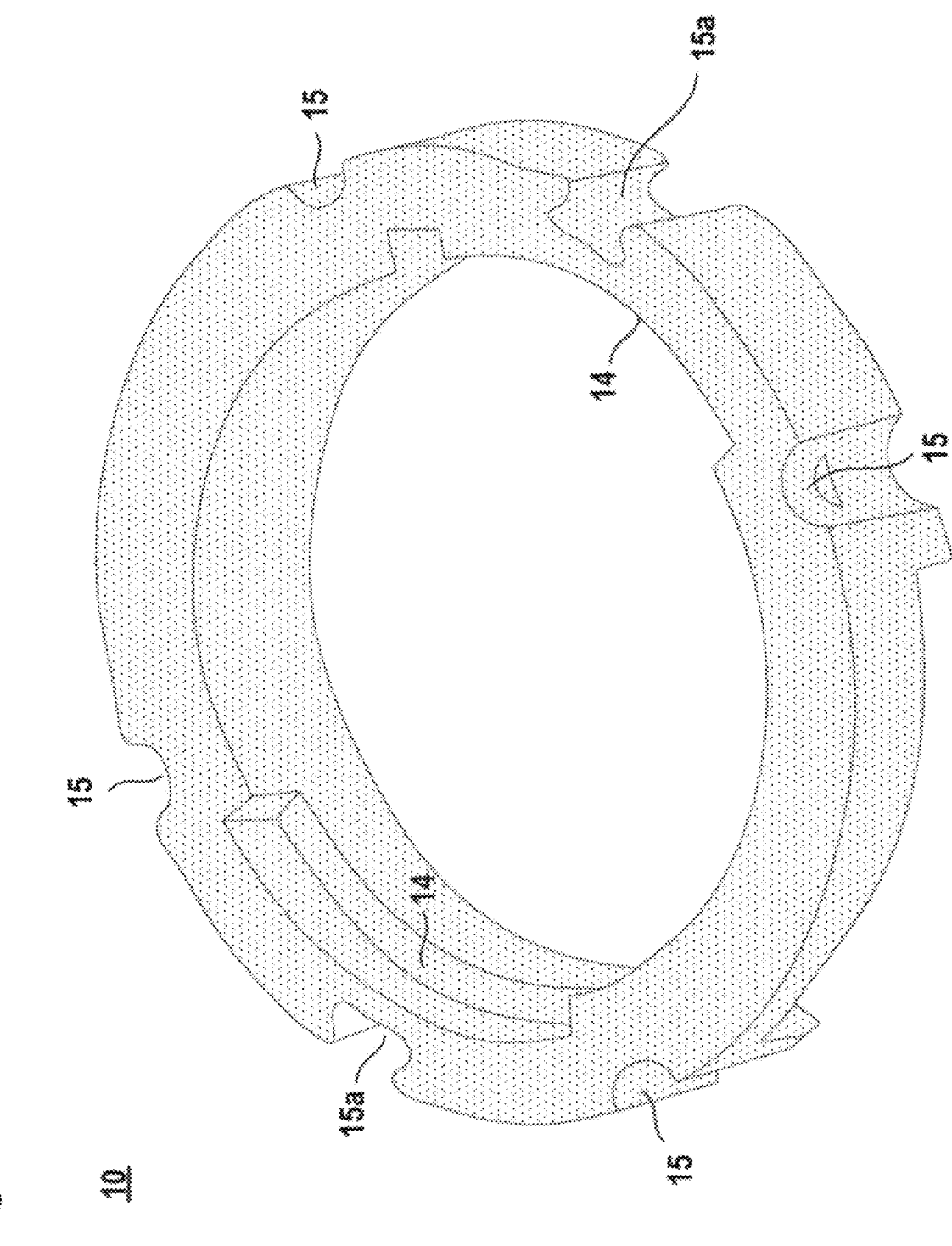
FIG. 4: Individual depiction of a retaining ring of the fastener.

The fastener 2 is fixed to a substrate, which is formed, e.g., by a wall 6, in particular of a bathroom, wherein the wall 6 naturally runs in a vertical plane, contrary to the depiction in FIG. 4. The terms "top" and "bottom" are defined with reference to the substrate to which the bottom of the fastener 2 is fixed.

The object mount 3 can be placed upon the fastener 2. A setscrew 7 is mounted on a side wall of the object mount 3 for fixing to the fastener 2.

The fastener 2 has an essentially cylindrical outer contour and is, like the object mount 3, designed with rotational symmetry to an axis of rotation running in the axial direction of the object holder 3 or of the fastener 2.

Figure 2:
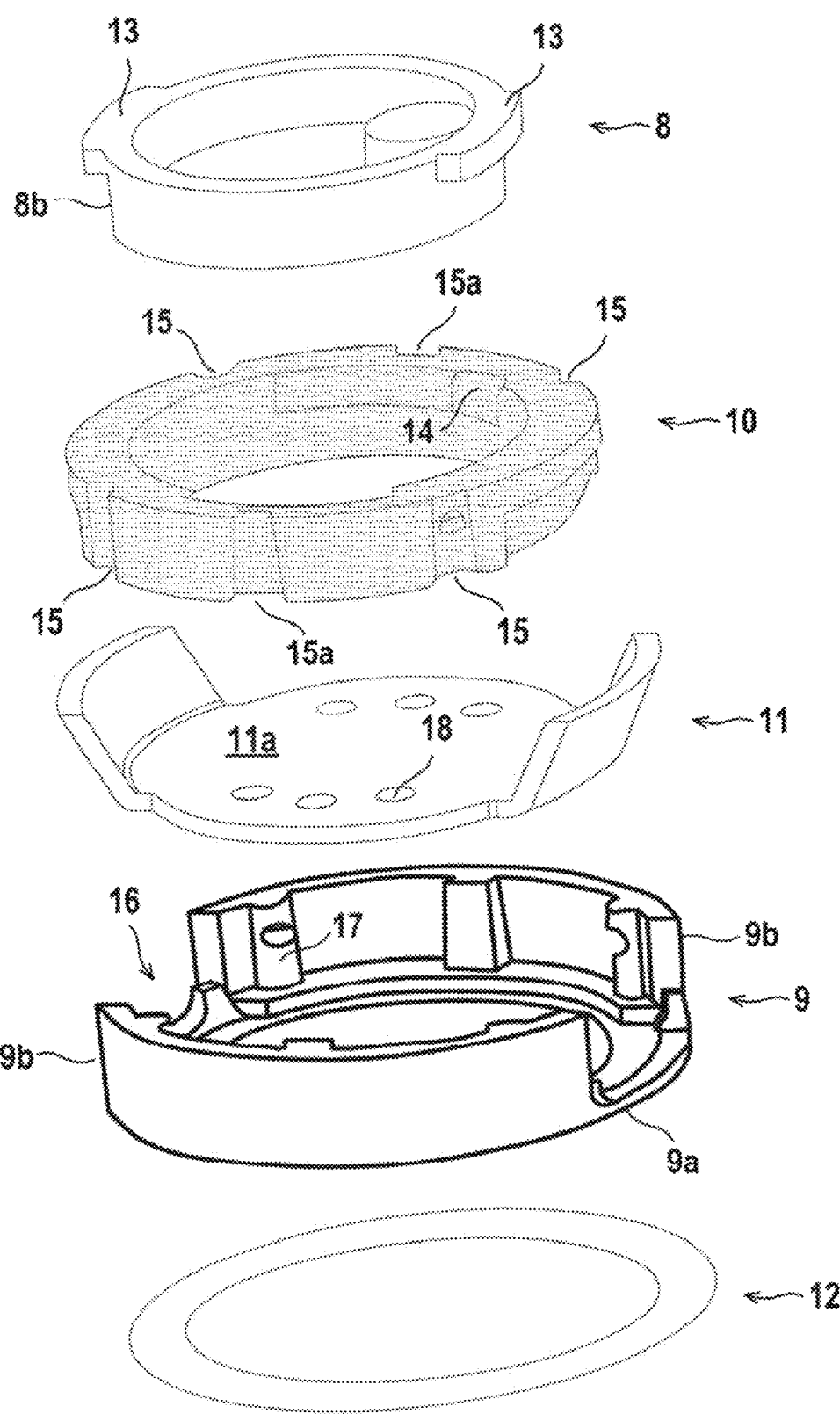
FIG. 2: Depiction of the components of the fastener according to FIG. 1.

As shown in FIG. 2, the fastener has, as individual components, a press-on element 8 (individually depicted in FIG. 5), a ring-shaped holder 9 (individually depicted in FIG. 6), a retaining ring 10 (individually depicted in FIG. 4), a reinforcement part 11 (individually depicted in FIG. 5) and an adhesive strip 12 in the form of a double-sided adhesive strip.

The reinforcement part 11 is composed of steel. The press-on element 8, the retaining ring 10 and the ring-shaped holder 9 are composed of plastic.

Figure 3:
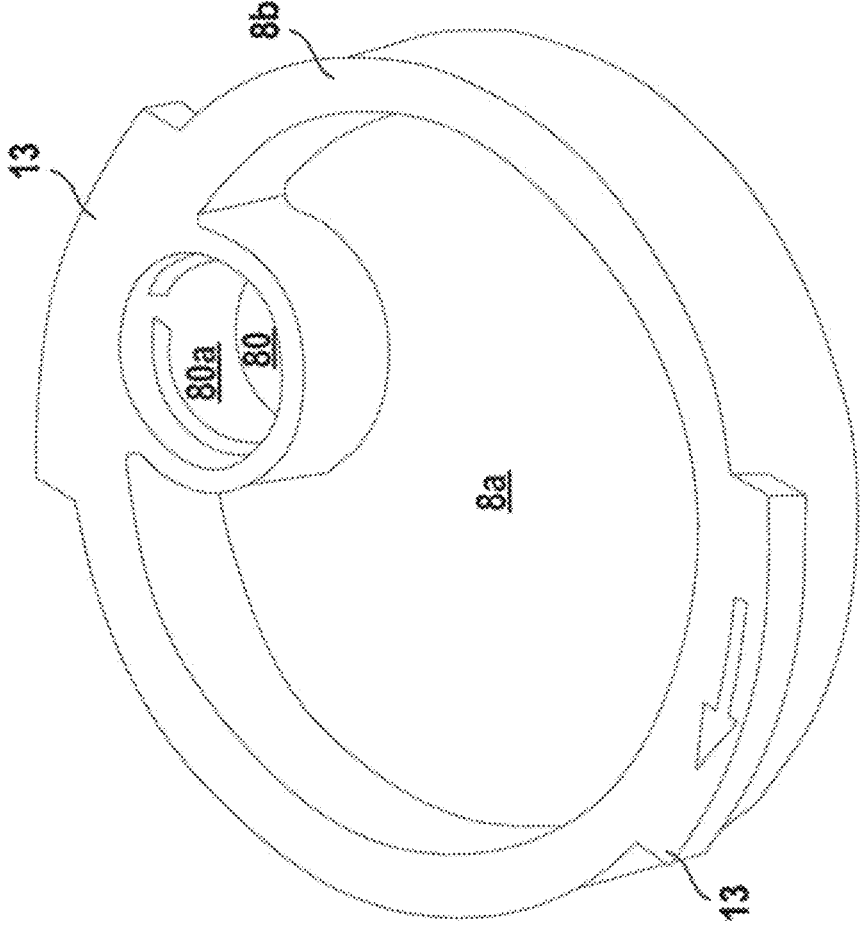
FIG. 3: Individual depiction of a press-on element of the fastener.

The press-on element 8 has a circular-disk shaped base 8a and a hollow-cylindrical wall 8b, which opens out on the edge of the base 8a and is oriented perpendicular thereto (FIG. 3).

There is a filling opening 80 in the base 8a, wherein the press-on element 8 a thread 80a in the form of a female thread is present in the wall segment 8b bordering the filling opening 80.

Latching lips 13 open out on regions situated opposite one another of the upper edge of the wall 8b of the press-on element 8. The two latching lips 13 are identically formed and project outward from the lateral surface of the press-on element 8.

On the upper edge of its inner side, the circular retaining ring 10 has two identical recesses 14 that are adapted to the shape and size of the latching lips 13 (FIG. 4).

On its outer lateral surface, the retaining ring 10 has round cavities 15 and wedge-shaped cavities 15a.

Figure 6:
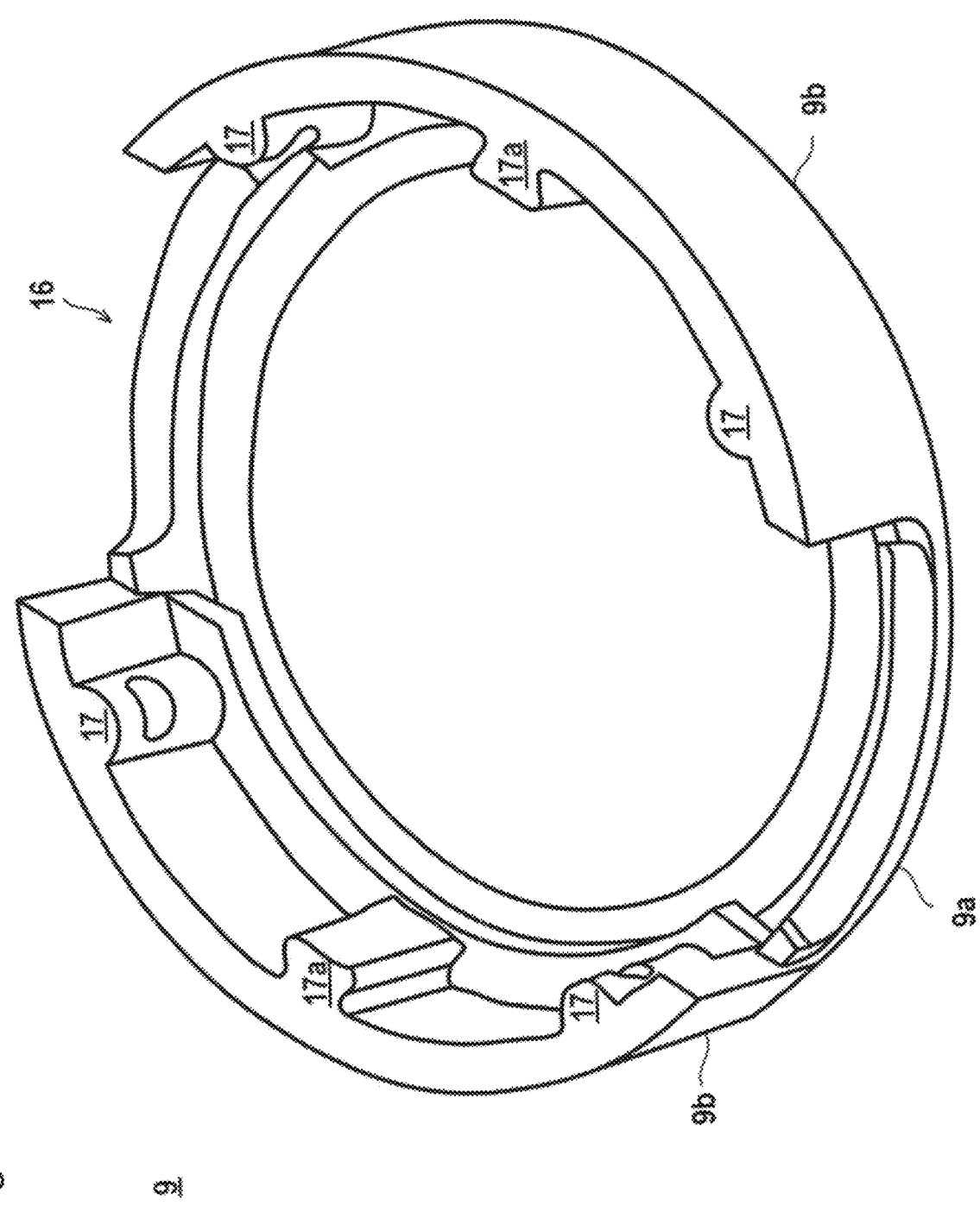
FIG. 6: Individual depiction of a ring-shaped holder of the fastener.

The ring-shaped holder 9 has a base segment 9a and projecting perpendicular from this, two wall segments 9b, which are separated from one another by two identically designed gaps 16 situated opposite one another (FIG. 6).

The inner contour of the ring-shaped holder 9 is adapted to the outer contour of the retaining ring 10. In particular, on the inner contour of the ring-shaped holder 9 there are protrusions 17 and wedge-shaped protrusions 17a, the contours of which are adapted to the contours of the cavities 15 and wedge-shaped cavities 15a of the retaining ring 10.

Figure 5:
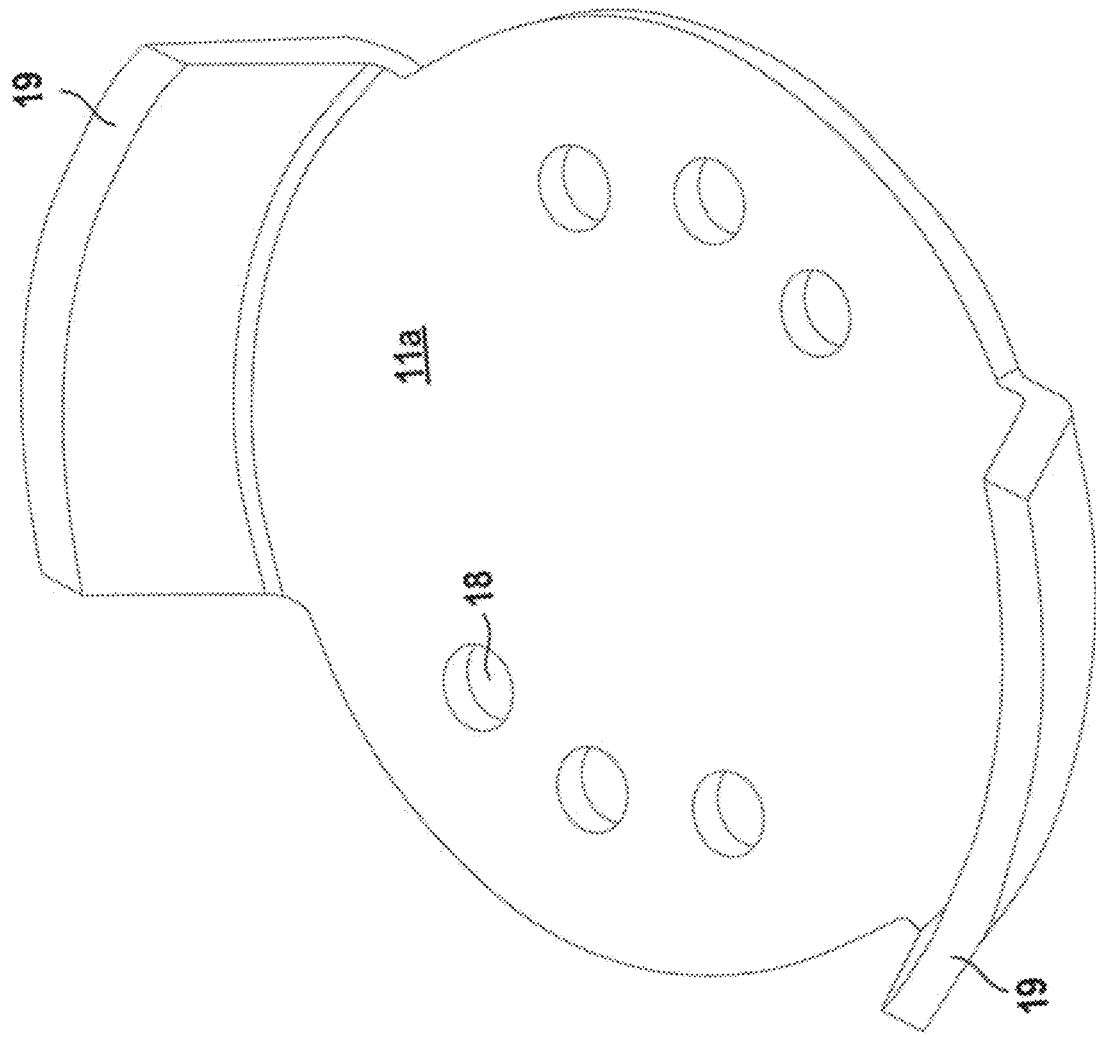
FIG. 5: Individual depiction of a reinforcement part of the fastener.

The reinforcement part 11 composed of steel has a circular-disk shaped flat body 11a with a structure of circular openings 18 (FIG. 5). Side wall elements 19 open out on opposite edges of the flat body 11a, the outer sides of said elements forming sloping surfaces inclined toward the flat body 11a.

Figure 7:
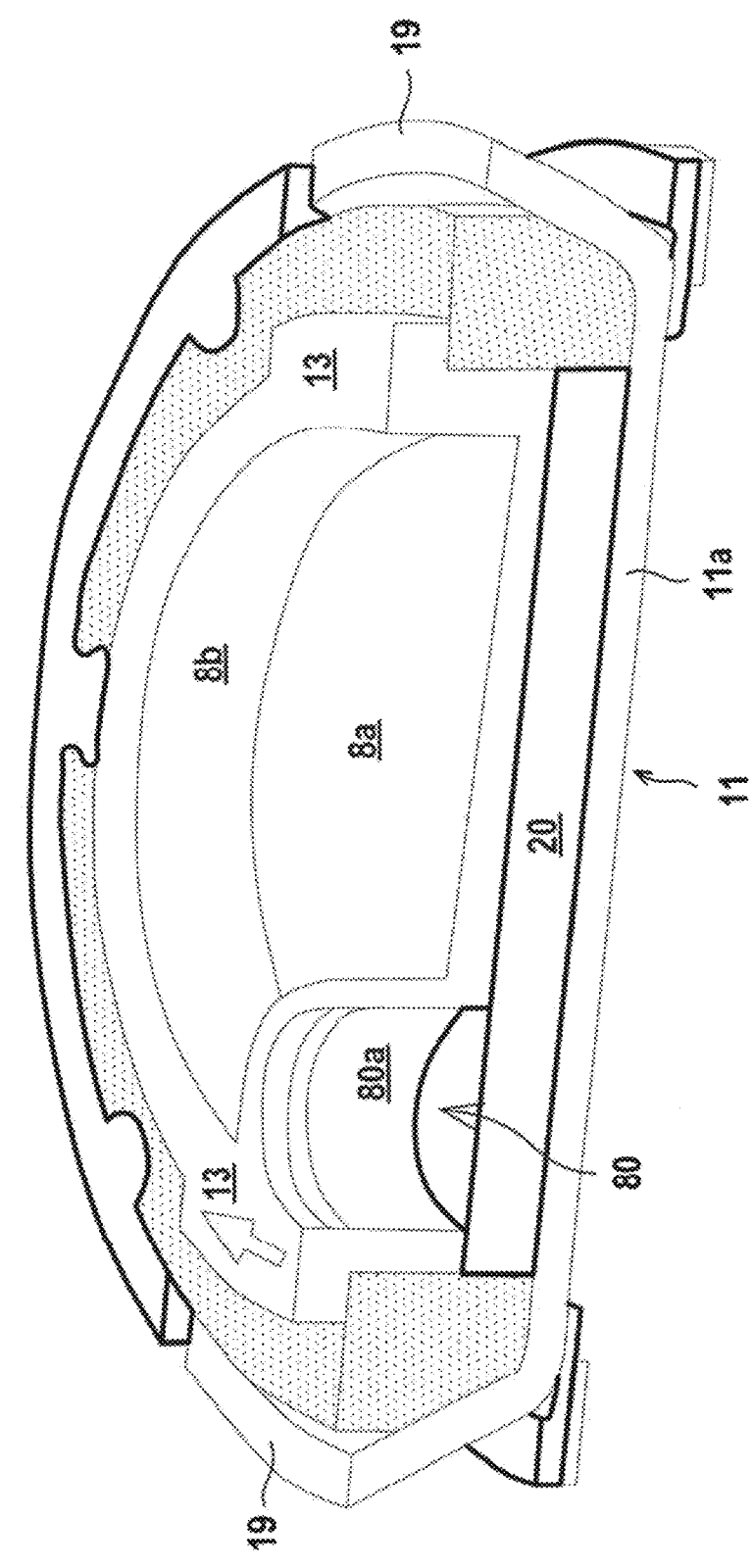
FIG. 7: Cross-sectional depiction of the fastener in the form of a pre-mounted unit.
Figure 8:
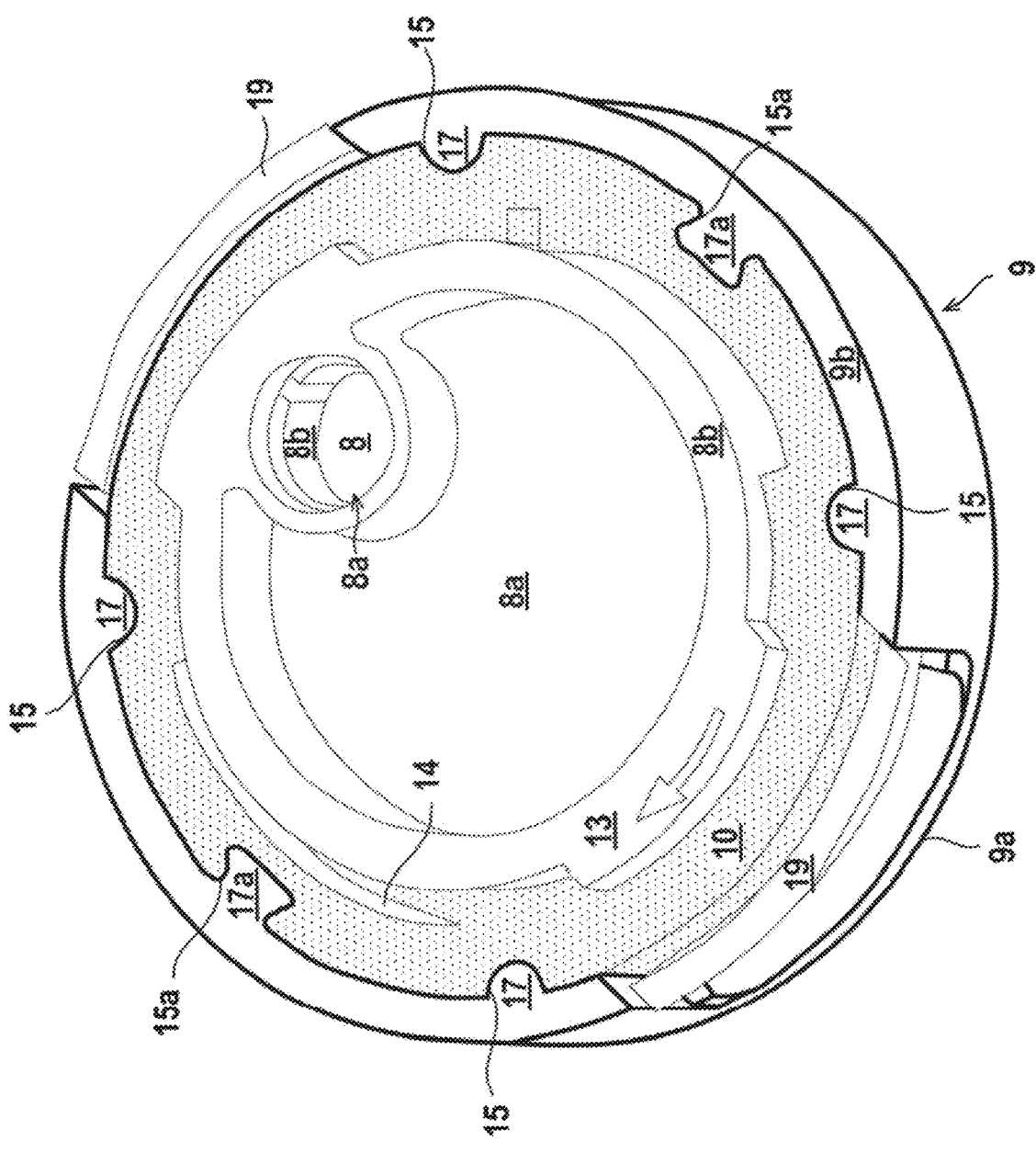
FIG. 8: Perspective depiction of the arrangement according to FIG. 7 with a top-down view onto the top of the fastener.
Figure 9:
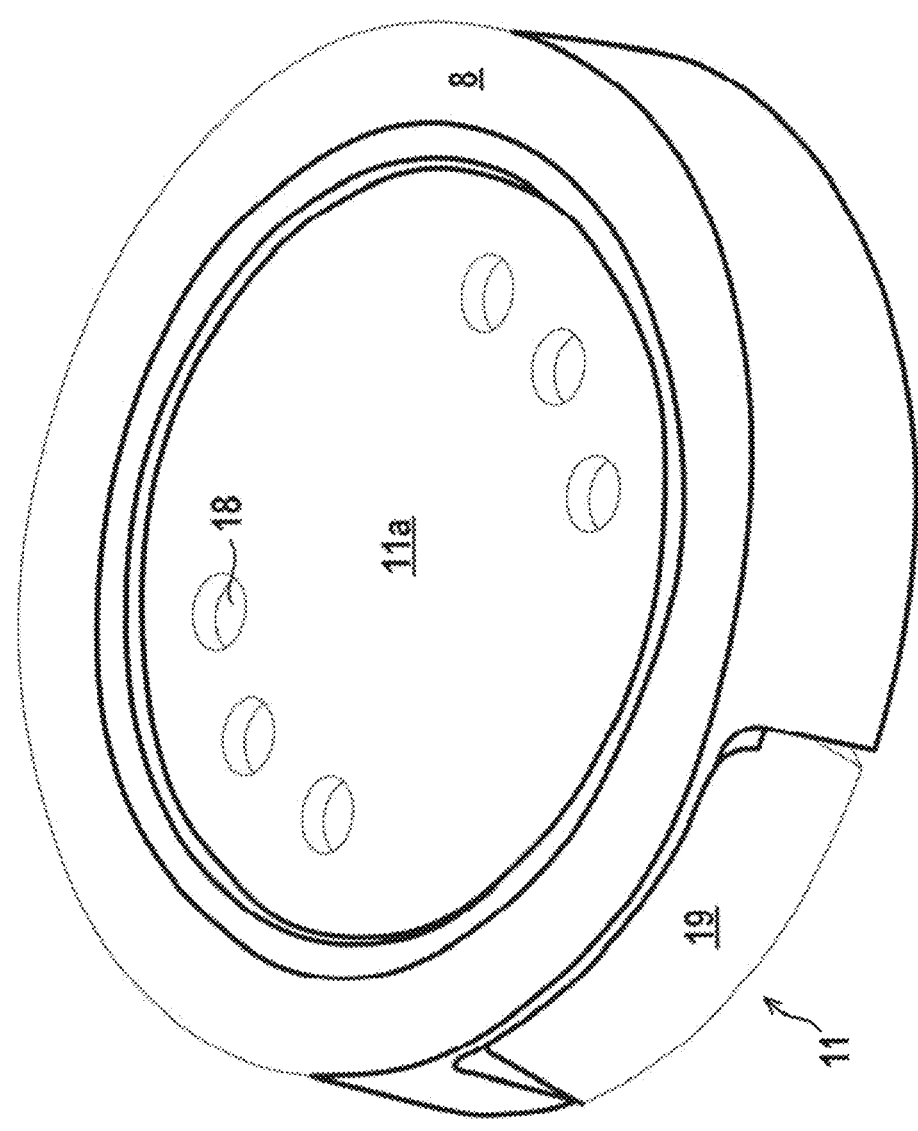
FIG. 9: Perspective depiction of the arrangement according to FIG. 7 with a top-down view onto the bottom of the fastener.

FIGS. 7 to 9 show a pre-mounted unit of the fastener 2, in which the retaining ring 10 is fixed to the ring-shaped holder 9 and the reinforcement part 11 is thus positionally fixed between retaining ring 10 and ring-shaped holder 9.

The retaining ring 10 with its cavities 15, 15a, is latched onto the protrusions 17, 17a that are provided on the inner sides of the wall segments 9b of the ring-shaped holder 9, by which the retaining ring 10 is fixed to the ring-shaped holder 9 so as to be secured against rotation and the reinforcement part 11 is positionally fixed.

The side wall elements 19 of the reinforcement part 11 are mounted with minimal play in the gaps 16 between the wall segments 9b of the ring-shaped holders 9, and such that their edge regions project outward beyond the ring-shaped holder 9. These projecting edge regions of the reinforcement part 11 form contact surfaces that abut the inner side of the object mount 3 when it is positioned on the fastener 2.

In the pre-mounted unit of the fastener 2 (FIGS. 7 to 9), the press-on element 8 is in a locked position. In the locked position, the latching lips 13 of the press-on element 8 lie on the upper edge of the retaining ring 10, outside of the recesses 14.

The base 8a of the press-on element 8 is thus spaced above the flat body 11a of the reinforcement part 11. The intermediate space between the base 8a of the press-on element 8 and the flat body 11a of the reinforcement part forms an adhesive reservoir 20, which is laterally delimited by the retaining ring 10.

Figure 13:
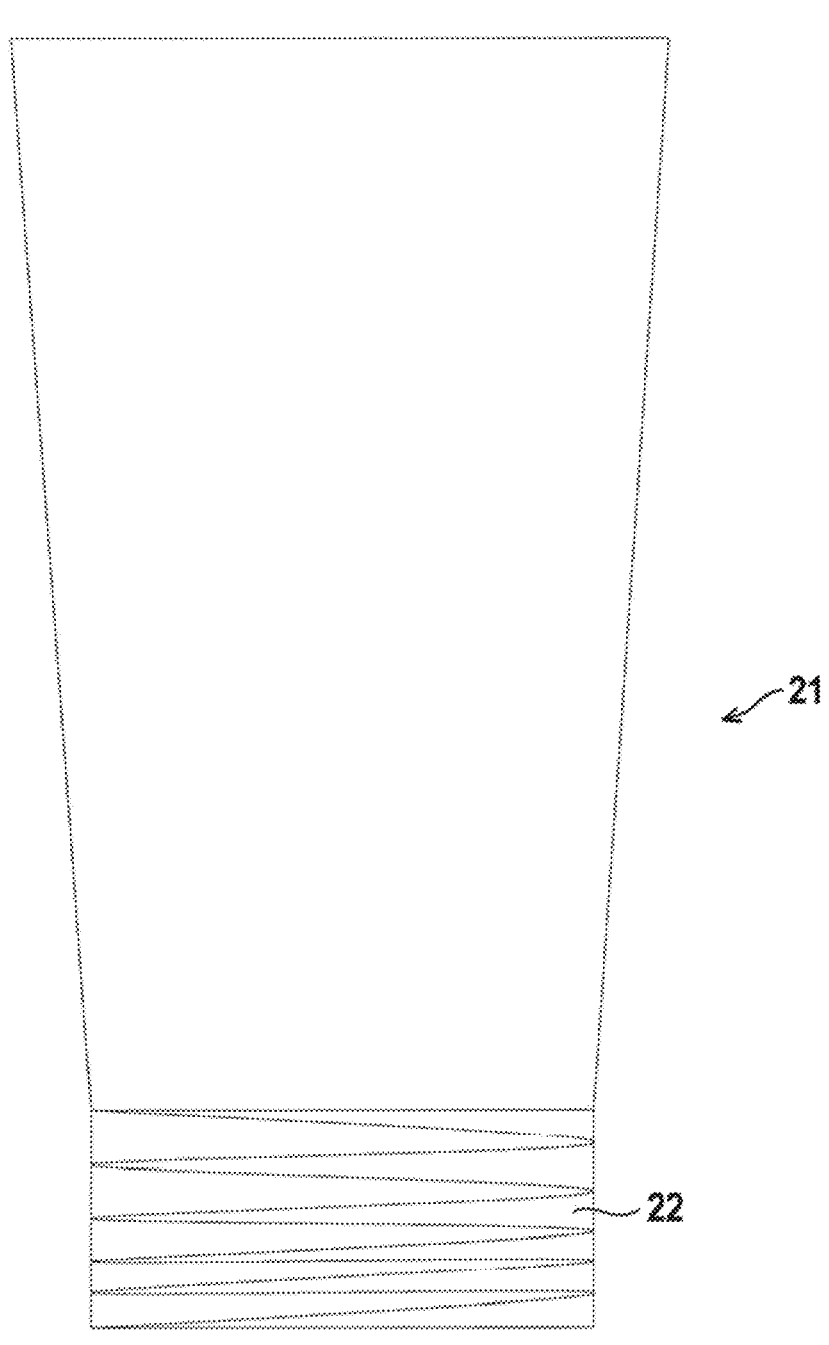
FIG. 13: Individual depiction of a tube containing adhesive agent.

The adhesive reservoir 20 can be filled with adhesive agent. A tube 21 can be used for this purpose, as depicted in FIG. 13. The tube 21 has a threaded head 22. The threaded head 22 is screwed into the thread 80a of the filling opening 80. The adhesive agent is then filled into the adhesive reservoir 20 from the tube 21.

Figure 10:
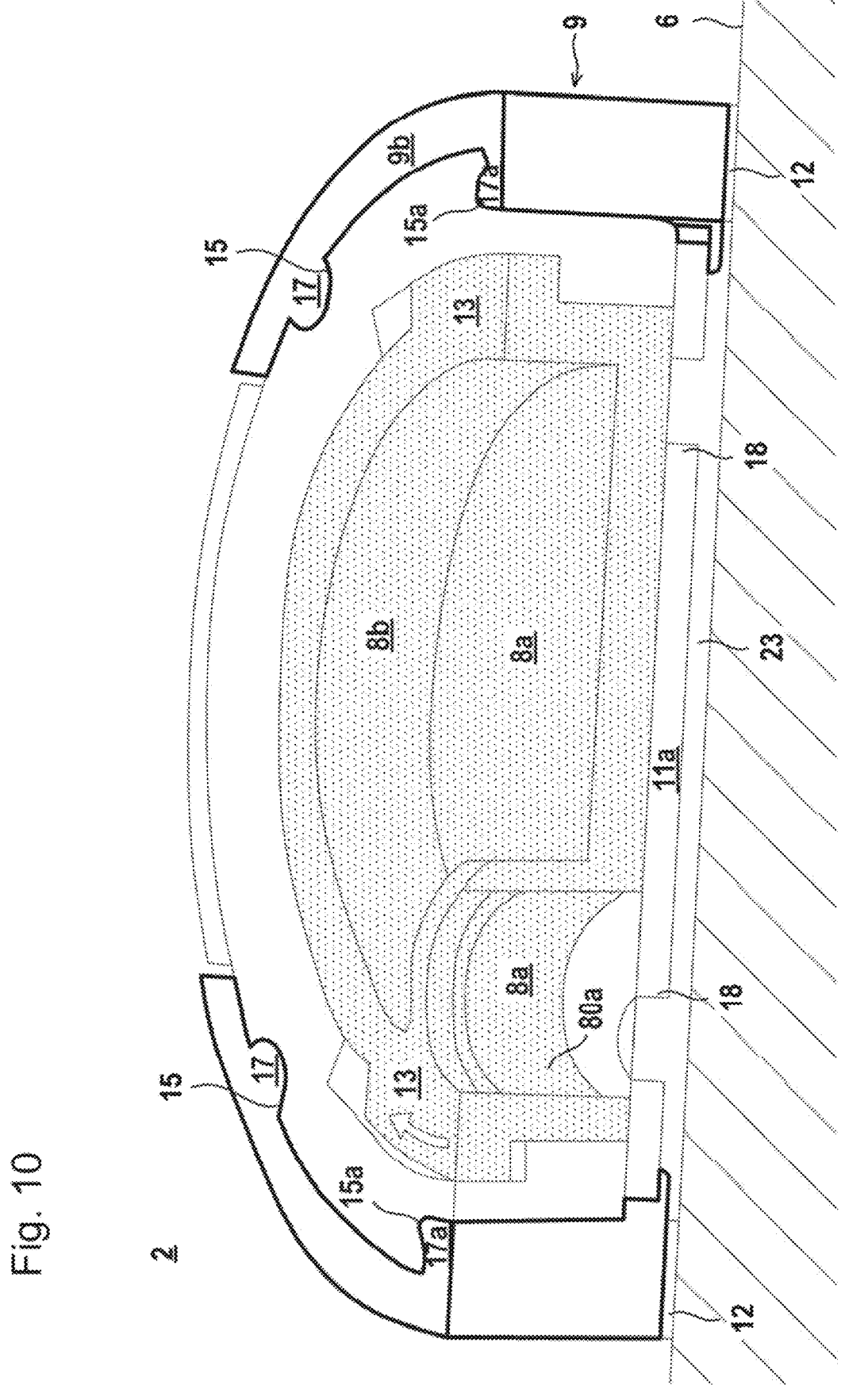
FIG. 10: Cross-sectional depiction of the fastener fixed to a substrate.
Figure 11:
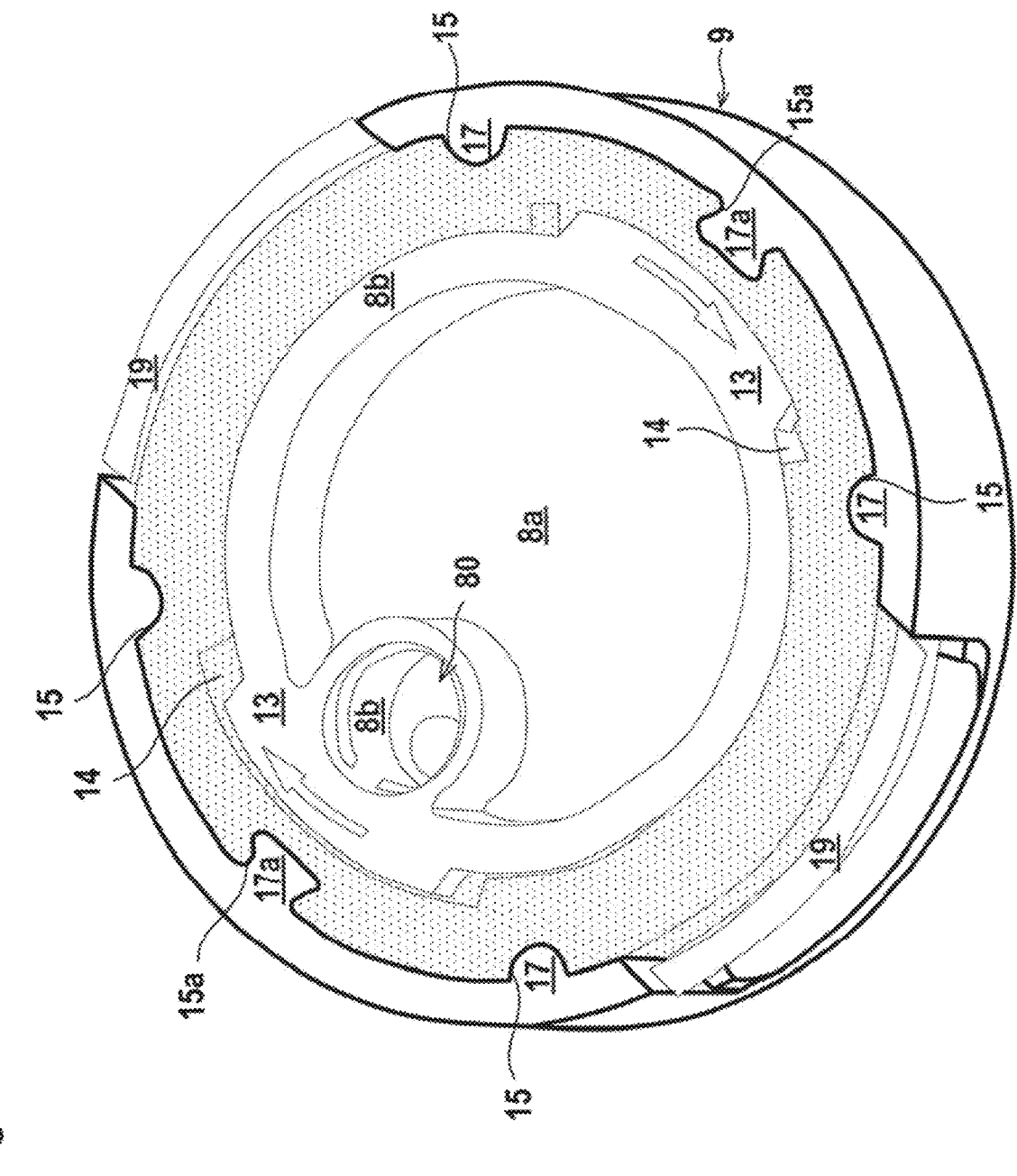
FIG. 11: Perspective depiction of the arrangement according to FIG. 10 with a top-down view onto the top of the fastener.
Figure 12:
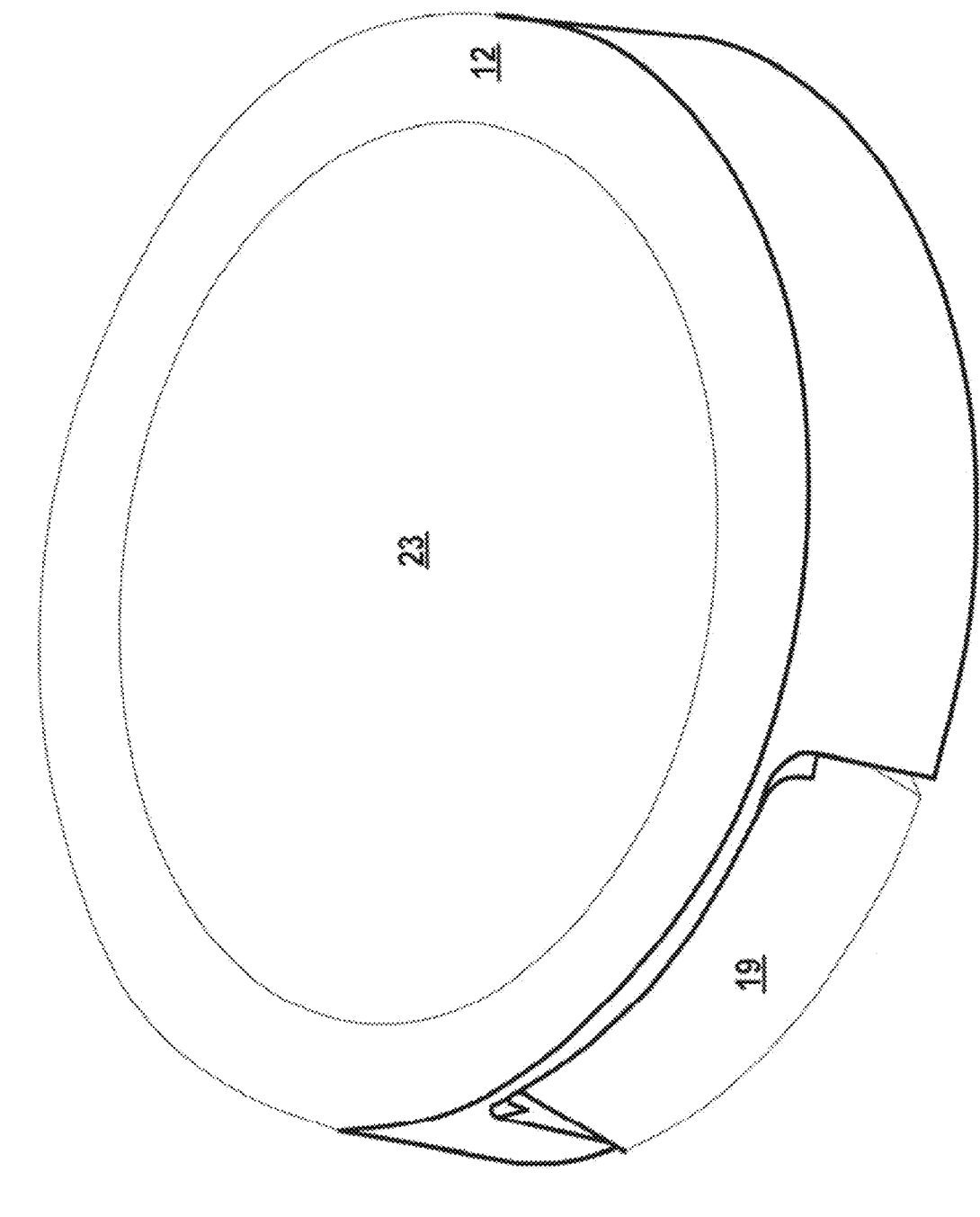
FIG. 12: Perspective depiction of the arrangement according to FIG. 10 with a top-down view onto the bottom of the fastener.

FIGS. 10 to 12 show the fastener 2 fastened to the wall 6.

In a first step, the fastener 2 is pre-fixed to the wall 6 in a target position by means of the adhesive strip 12.

In a second step, the press-on element 8 is shifted out of the locked position into an actuation position, which is depicted in FIGS. 10 and 11.

To do so, a user rotates the press-on element 8 about an axis of rotation running in the axial direction and presses the press-on element 8 downward in the direction of the flat body 11a of the reinforcement part 11 until the press-on element 8 is seated on the reinforcement part 11 (FIG. 10).

In this way the adhesive agent is guided out of the adhesive reservoir 20 solely through the openings 18 of the reinforcement part 11, such that the adhesive agent forms an adhesive layer 23 between the flat body 11a of the reinforcement part 11 and the wall 6, which layer 23 extends into the openings 18 of the flat body 11a.

After the adhesive layer 23 has cured by air contact, the fastener 2 is permanently fixed to the wall 6 by this adhesive layer 23.

After the fastener 2 has been fixed to the wall 6, the object 4 can be fastened to the fastener 2 by pulling the object mount 3 over the fastener 2.

The side wall elements 19 of the reinforcement part 11 then abut the inner wall of the object mount 3. The setscrew 7 is then guided against the sloping surface of a side wall element 19, whereby the object mount 3 and thus the object 4 is fixed to the fastener 2 by means of the side wall elements 19.

LIST OF REFERENCE NUMERALS (1) fastener arrangement
(2) fastener
(3) object mount
(4) object
(5) body
(6) wall
(7) setscrew
(8) press-on element
(8a) base
(8b) wall
(9) ring-shaped holder
(9a) base segment
(9b) wall segment
(10) retaining ring
(11) reinforcement part
(11a) flat body
(12) adhesive strip
(13) latching lip
(14) recess
(15) cavity
(15a) wedge-shaped cavity
(16) gap
(17) protrusion
(17a) wedge-shaped protrusion
(18) opening
(19) side wall element
(20) adhesive reservoir
(21) tube
(22) threaded head
(23) adhesive layer
(80) filling opening
(80a) thread

The invention claimed is:

1. A fastener arrangement (1) with a fastener (2), which is designed for fastening to a substrate by means of an adhesive agent, and having an object (4) with an object mount (3), wherein the object mount (3) can be fixed to the fastener (2) fastened to the substrate, characterized in that the fastener (2) has a reinforcement part (11) composed of a metallic material, wherein the reinforcement part (11) has a flat body (11a) with openings (18) and side wall elements (19) that border the flat body (11a), in that the side wall elements (19) are mounted between a retaining ring (10) and wall segments (9b) of a ring-shaped holder (9), wherein the side wall elements (19) of the reinforcement part (11) are designed for fixing the object mount (3), in that there is an adhesive reservoir (20), the bottom of which facing the substrate is only delimited by the flat body (11a) of the reinforcement part (11), and the top of which is delimited by a press-on element (8), wherein by a displacement of the press-on element (8) in the axial direction, adhesive agent is guided out of the adhesive reservoir (20) only via the openings in the flat body (11a) of the reinforcement part (11), such that the adhesive agent fixes the fastener (2) to the substrate, wherein the fastener (2) has an essentially rotationally-symmetrical outer contour, and that the flat body (11a) of the reinforcement part (11) is designed in a circular-disk shape.

2. The fastener arrangement (1) according to claim 1, characterized in that the reinforcement part (11) is composed of steel, and that the retaining ring (10), the ring-shaped holder (9) and the press-on element (8) are composed of plastic.

3. The fastener arrangement (1) according to claim 1, characterized in that the retaining ring (10) laterally delimits the adhesive reservoir (20).

4. The fastener arrangement (1) according to claim 1, characterized in that the adhesive agent guided out through the openings (18) of the flat body (11*a*) of the reinforcement part (11) forms an adhesive layer (23), the top of which is delimited by the flat body (11*a*) of the reinforcement part (11) and the bottom of which is in contact with the substrate.

5. The fastener arrangement (1) according to claim 1, characterized in that the retaining ring (10) is mounted on the ring-shaped holder (9) so as to be secured against rotation in that protrusions (17, 17*a*) open out on the inner side of the ring-shaped holder (9), which protrusions engage in the cavities (15, 15*a*) on the outer lateral surface of the retaining ring (10).

6. A fastener arrangement (1) with a fastener (2), which is designed for fastening to a substrate by means of an adhesive agent, and having an object (4) with an object mount (3), wherein the object mount (3) can be fixed to the fastener (2) fastened to the substrate, characterized in that the fastener (2) has a reinforcement part (11) composed of a metallic material, wherein the reinforcement part (11) has a flat body (11*a*) with openings (18) and side wall elements (19) that border the flat body (11*a*), in that the side wall elements (19) are mounted between a retaining ring (10) and wall segments (9*b*) of a ring-shaped holder (9), wherein the side wall elements (19) of the reinforcement part (11) are designed for fixing the object mount (3), in that there is an adhesive reservoir (20), the bottom of which facing the substrate is only delimited by the flat body (11*a*) of the reinforcement part (11), and the top of which is delimited by a press-on element (8), wherein by a displacement of the press-on element (8) in the axial direction, adhesive agent is guided out of the adhesive reservoir (20) only via the openings in the flat body (11*a*) of the reinforcement part (11), such that the adhesive agent fixes the fastener (2) to the substrate, characterized in that the reinforcement part (11) has two identical side wall elements (19) that open out on wall segments (9*b*) of the flat body (11*a*) that are situated opposite one another, wherein the side wall elements (19) form a mirror-symmetrical arrangement.

7. The fastener arrangement (1) according to claim 6, characterized in that the side wall elements (19), starting from the wall segments (9*b*) of the flat body (11*a*), run outwards at an inclination to the flat body.

8. The fastener arrangement (1) according to claim 6, characterized in that the side wall elements (19) are mounted with minimal play in gaps (16) of a side wall of the ring-shaped holder (9) such that the outer edges of the side wall elements (19) project beyond the outer lateral surface of the ring-shaped holder (9), wherein the outer edges of the side wall elements (19) serve for fixing the object mount (3).

9. The fastener arrangement (1) according to claim 8, characterized in that the object mount (3) has the shape of a hollow cylinder open at one end, wherein the fastener (2) can be inserted into the object mount (3) through the open end, wherein the outer edges of the side wall elements (19) abut the inner side of the hollow cylinder.

10. The fastener arrangement (1) according to claim 9, characterized in that for fixing the object mount (3) to the fastener (2) a setscrew (7) mounted in the object mount (3) is guided against one of the side wall elements (19) of the reinforcement part (11).

11. The fastener arrangement (1) according to claim 1, characterized in that the press-on element (8) has a circular-disk shaped base (8*a*) and a circumferential wall (8*b*) on its edge, wherein on the upper edge of the wall (8*b*), latching lips that project outward beyond the edge of the wall are provided.

12. The fastener arrangement (1) according to claim 11, characterized in that recesses (14) in the retaining ring (10) corresponding to the latching lips (13) are provided, the contours and number of which recesses (14) are adapted to the contours and number of the latching lips (13), wherein the recesses (14) in each case open out on the top and inner side of the retaining ring (10).

13. A fastener arrangement (1) with a fastener (2), which is designed for fastening to a substrate by means of an adhesive agent, and having an object (4) with an object mount (3), wherein the object mount (3) can be fixed to the fastener (2) fastened to the substrate, characterized in that the fastener (2) has a reinforcement part (11) composed of a metallic material, wherein the reinforcement part (11) has a flat body (11*a*) with openings (18) and side wall elements (19) that border the flat body (11*a*), in that the side wall elements (19) are mounted between a retaining ring (10) and wall segments (9*b*) of a ring-shaped holder (9), wherein the side wall elements (19) of the reinforcement part (11) are designed for fixing the object mount (3), in that there is an adhesive reservoir (20), the bottom of which facing the substrate is only delimited by the flat body (11*a*) of the reinforcement part (11), and the top of which is delimited by a press-on element (8), wherein by a displacement of the press-on element (8) in the axial direction, adhesive agent is guided out of the adhesive reservoir (20) only via the openings in the flat body (11*a*) of the reinforcement part (11), such that the adhesive agent fixes the fastener (2) to the substrate, characterized in that the press-on element (8) can be shifted from a locked position into an actuation position, wherein adhesive agent can be stored in the adhesive reservoir (20) and wherein in the actuation position, adhesive agent is guided out of the adhesive reservoir (20) through the openings (18) of the flat body (11*a*) of the reinforcement part (11).

14. The fastener arrangement (1) according to claim 12, characterized in that in the locked position the press-on element (8) with the latching lips (13) lies on the edge of the retaining ring (10), such that the press-on element (8) projects upward beyond the top of the retaining ring (10) and the bottom of the base (8*a*) is distanced from the flat body (11*a*) of the reinforcement part (11), wherein the intermediate space between the base (8*a*) of the retaining ring (10) and the flat body (11*a*) of the reinforcement part (11) forms the adhesive reservoir (20).

15. The fastener arrangement (1) according to claim 14, characterized in that the reinforcement part (11) is switched out of the locked position into the actuation position by rotating the reinforcement part (11) and pressing against the top of the reinforcement part (11), in which actuation position the latching lips (13) of the reinforcement part (11) lie inside the recesses (14) of the retaining ring (10), and the base (8*a*) of the press-on element (8) is guided against the flat body (11*a*) of the reinforcement part (11).

16. The fastener arrangement (1) according to claim 14, characterized in that the press-on element (8) has a filling opening (80) through which adhesive agent can be supplied into the adhesive reservoir (20) when the press-on element (8) is in the locked position, wherein adhesive agent stored in a tube (21) can be supplied to the adhesive reservoir (20) through the filling opening (80).

17. The fastener arrangement (1) according to claim 16, characterized in that the filling opening (80) has a thread (80*a*) onto which a threaded head (22) of the tube (21) can be screwed, wherein adhesive agent can be supplied to the adhesive reservoir (20) when the tube (21) is screwed onto the filling opening (80).

18. The fastener arrangement (1) according to claim 1, characterized in that an adhesive strip (12) is provided on the bottom of the ring-shaped holder (9), wherein a pre-fixing of the fastener (2) to the substrate can be carried out by means of the adhesive strip (12).

\* \* \* \* \*